May 13, 1969  R. B. WHITESIDE ET AL  3,443,617
PRESS INSERT
Filed Nov. 2, 1967
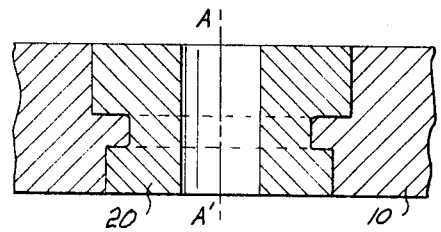
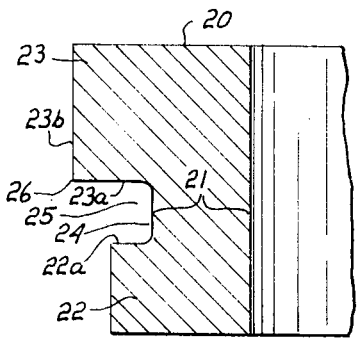
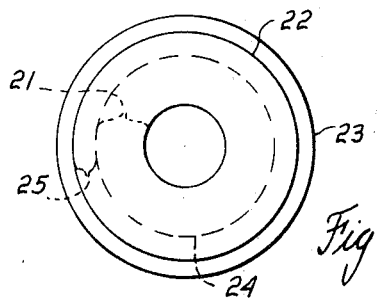
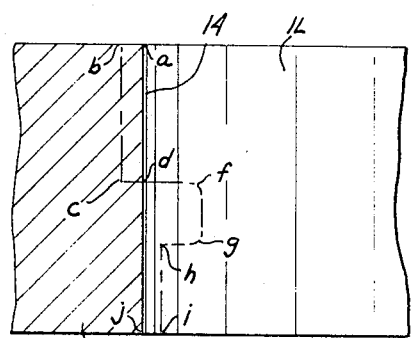
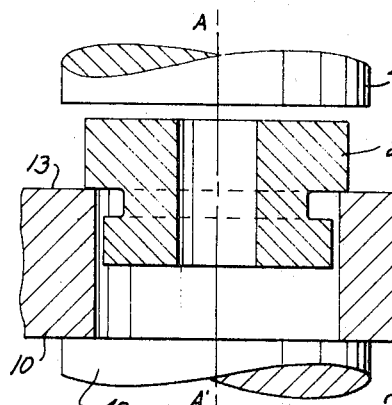
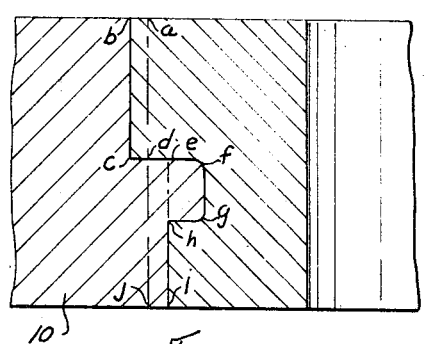
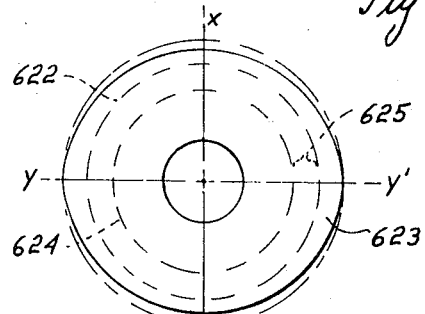
INVENTOR
Roger B Whiteside
Kenneth J Kulju
BY Synnestvedt & Lechner
ATTORNEY

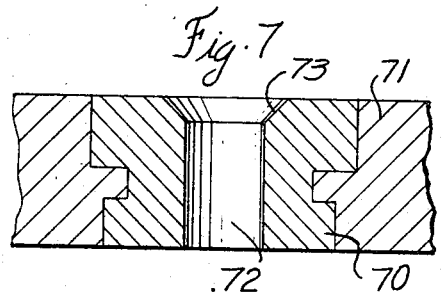
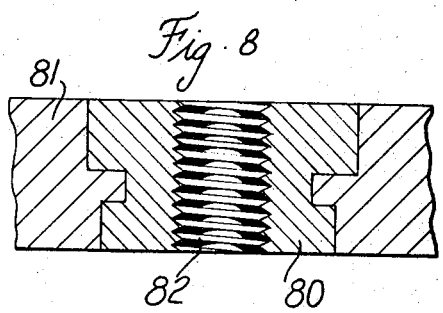
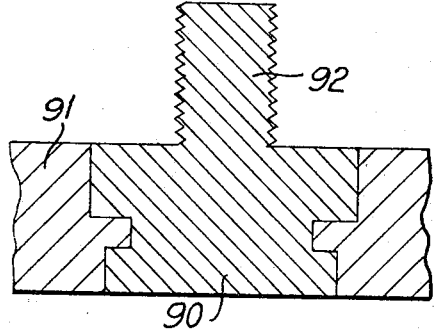
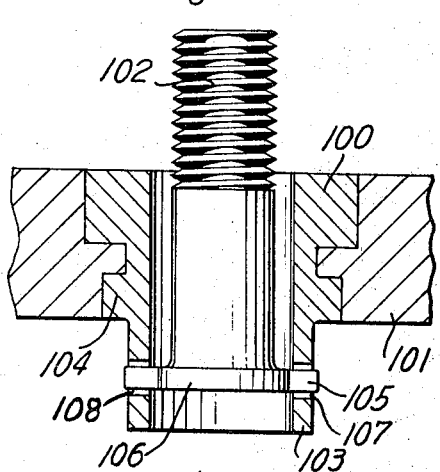
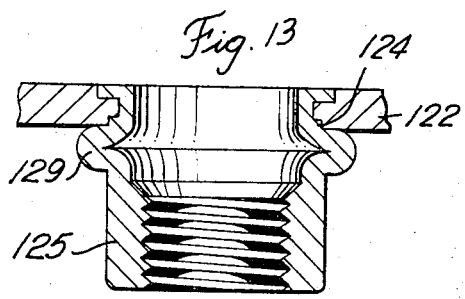
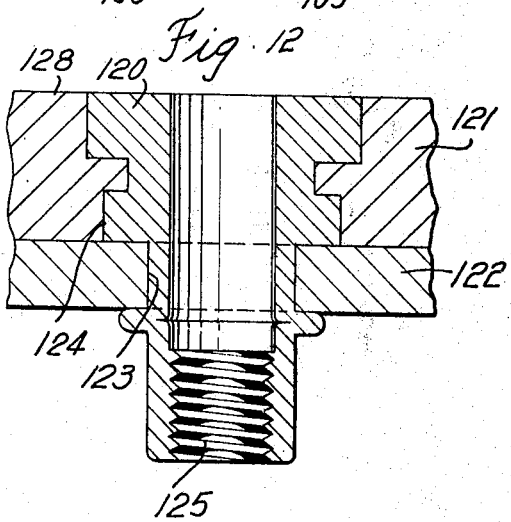
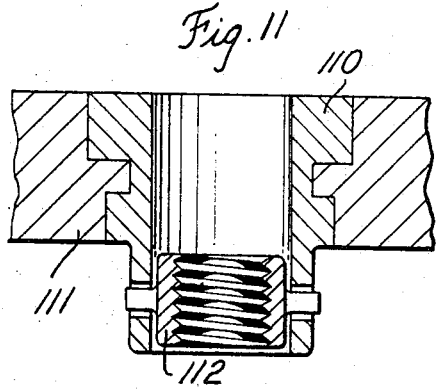
INVENTOR.
Roger B Whiteside
Kenneth W Kulju

United States Patent Office 3,443,617
Patented May 13, 1969

3,443,617
PRESS INSERT
Roger B. Whiteside, Cinnaminson, N.J., and Kenneth M. Kulju, Southampton, Pa., assignors to Standard Pressed Steel Co., Jenkintown, Pa., a corporation of Pennsylvania
Continuation-in-part of application Ser. No. 555,522, June 6, 1966. This application Nov. 2, 1967, Ser. No. 681,311
Int. Cl. F16b *39/00, 13/06, 33/04*
U.S. Cl. 151—41.73                    12 Claims

ABSTRACT OF THE DISCLOSURE

A press insert and a panel member having an opening into which the insert is forced. The shape and dimensions of the insert relative to the panel opening are such that as the insert is forced into the opening, panel material cold flows against the surfaces of the insert to tightly secure the insert in the panel. The surfaces of the insert that contact cold flowed panel material are free of re-entrant points or edges that can create stress concentrations.

---

This application is a continuation-in-part of copending application Ser. No. 555,522, filed June 6, 1966, now abandoned.

This invention relates to press inserts (i.e., a self-clinching insert) and to composite sheet or panel structures made using such inserts. The inserts can be used to provide fastener openings or to mount various types of fasteners.

Heretofore, in order to prevent rotation of the insert after installation or to prevent the insert from pulling out when the sheet or panel is subjected to flexing, the surfaces of the insert that contact the cold flowed panel material have been provided with re-entrant points or edges. While such arrangements will prevent rotation and pull out, they create stress concentrations and thereby reduce the fatigue life of the assembly. In addition, the self-clinching inserts of the prior art have a configuration that is inherently incapable of developing uniform radial compressive stresses around the panel opening in which the insert is installed.

Accordingly, it is an object of this invention to provide a press insert that is dimensioned and contoured in such a way that a true interference fit is established when the insert is installed and the compressive radial stresses about the installation aperture are uniformly distributed so as to increase the fatigue life. Further the press insert of this invention does not employ reentrant edges or points on the surface that contacts or grips the sheet in which insert is seated.

These and other objects are accomplished in accordance with this invention by a structure including a panel member and a press insert seated in a panel opening by cold flowing, the insert being harder than the panel and having a body section and a pair of outwardly projecting annular flanges, the opposed flange surfaces and the interconnecting insert web defining an external annular groove on the insert, the leading flange having a diameter that is less than the diameter of the panel opening in which the insert is to be seated, the trailing flange having an elliptical perimeter whose shorter axis is greater than the diameter of the panel opening in which the insert is to be seated, the volume of the panel material displaced by the trailing flange in the seating of the insert being at least equal to the sum of the volume of the insert groove plus the volume of the annular void between the panel opening and the leading flange extending for the full length of its periphery to an extended intercept with the opposed flange face of the trailing flange, the surfaces of the insert that contact cold flowed panel material being free of re-entrant points or edges that can create stress concentrations.

In the drawings, the dimensions are exaggerated in order to facilitate the illustration and explanation of the invention.

FIGURE 1 is a sectional view of a panel structure and a press insert of the present invention.

FIGURE 2 is an enlarged view of a section of the insert of FIGURE 1.

FIGURE 2a is a plan view of the insert of FIGURE 1 looking up from the face of the smaller flange in the position of FIGURE 2.

FIGURE 3 is an enlarged sectional view of the panel of FIGURE 1 before the insert is seated.

FIGURE 4 is an enlarged sectional view of the seated insert of FIGURE 1.

FIGURE 5 illustrates the installation of an insert in a panel opening.

FIGURE 6 is a plan view of a modified embodiment of an insert made in accordance with the invention.

FIGURES 7-13 illustrate some types of fasteners that can be mounted in panels using the insert of this invention.

Figure 14:
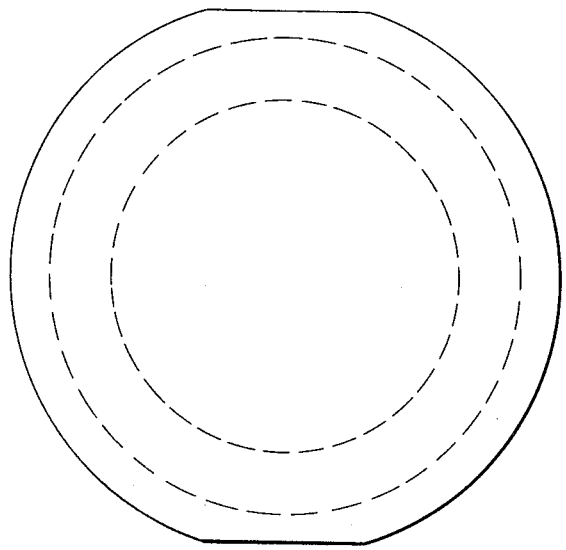
FIGURE 14 is a plan view of another modified embodiment of an insert made in accordance with the invention.

In the drawings, the invention is illustrated in terms of the installation of a press insert in a panel or sheet, and in the embodiment illustrated in FIGURES 1-5, the insert is provided with an aperture for receiving the shank or body of a fastener. It will be understood that the fastener receiving aperture of the insert can be modified so as to accommodate or receive fasteners of many different types. The installation of inserts made in accordance with this invention will increase the physicals (particularly the bearing strength of the sheet), will increase the fatigue life of the panel hole and will provide a hardened and wear resistant bearing surface so as to reduce or even eliminate failures in the bearing area.

With specific reference to the showing in the drawings, FIGURES 1 and 4 illustrate an assembled structure that includes a plate, sheet or panel member 10 and a press insert 20, that has been seated in an opening (11 in FIGURE 3) in the panel by a simple pressing operation. The insert is made of material that is sufficiently harder than the panel member so that pressing of the insert against the panel will cold flow the panel material without distorting the insert.

As can be been in FIGURE 2, the insert includes a body section 21, and a pair of outwardly projecting annular flanges 22 and 23. The opposed flange surfaces 22a, 23a and the interconnecting web 24 combine to define an external annular groove 25 about the body of the insert. For convenience in machining groove 25, the junctures of the flange faces 22a and 23a with the web 24 should be radiused; this will eliminate sharp corners in the insert and also provide a cross sectional configuration that is well adapted to receive cold flowed material from the panel wall.

The dimensioning of the flanges, the groove and panel opening are important features of the present invention. Thus, flange 23 (which shall sometimes be referred to as the trailing flange or the compression flange) has an outside diameter that is greater than the inside diameter of the opening 11 in the panel 10; and, in the simplest embodiment of the invention and as illustrated in FIGURES 2 and 2a, the compression flange has a circular cross section, thus the outer surface 23b of the flange is in the form of a cylinder of circular cross section, and the plane of compression flange face 23a is perpendicular to the cylindrical axis A–A'; this arrangement provides a good face and shoulder edge 26 for cold flowing panel material and inducing uniform compressive stresses. Further, the compression flange shall have sufficient thickness relative to its beam length to provide the rigidity to resist permanent distortion in the pressing operation.

For the embodiment of the invention illustrated, the volume (V1) of the panel material displaced by the seating of the insert in the opening 11 of panel 10 (i.e., the volume of the annulus whose radial cross section is defined a, b, c, d in FIGURES 3 and 4) is equal to the sum of the volume (V2) of the groove 25 (i.e. the volume of the annulus whose radial cross section is defined by e, f, g, h) plus the volume of an annular void whose radial cross section (d, e, i. j) is an annulus whose inside diameter is equal to the diameter of the pilot flange, whose outside diameter is equal to the panel opening diameter and whose height (j–d) is equal to the thickness of the pilot flange (h–i) plus the width of the groove opening (h–e).

By so dimensioning the flanges, the groove and the panel opening, the volume of cold flowing panel material will occupy the voids bounded by the surfaces of the insert within the panel opening 11 and the opening itself. As a result, inwardly directed compressional stresses will be thrown back and uniformly distributed about the panel opening in the general vicinity of the trailing flange 23. Thus, there is developed a very tight joint in which despite the lack of re-entrant edges and points along the junction line the insert will strongly resist rotation relative to the panel. Further, the parallel opposed flange surfaces 22a and 23a which are in contact with the flowed metal lie in planes that are perpendicular to the axis A–A' of the panel opening and they provide an arrangement that resists "push out," "pull through," "torque out," "tear out," etc. when the panel structure is stressed. Dimensioning the flanges, groove and panel opening such that the volume of cold flowing panel material is less than the volume of the voids between the insert and the panel opening results in inadequate resistance to "pull through" and "torque out" in most practical applications of the invention.

If it is desired to further increase the resistance of the insert to rotation relative to the panel, the flanges, groove and panel opening may be dimensioned so that the volume of cold flowing panel material is greater than the voids between the insert and the panel opening. Again, the panel material is flowed into intimate contact with the insert. However, because of the differential in volume between the cold flowed material and the voids between the insert and the panel opening, the panel is stressed to a greater degree and along a greater length through the thickness of the panel. Line a–j in FIGURE 3 represents a panel stressed throughout its entire thickness. For most practical applications, the volume of the panel material displaced by the trailing flange is kept at less than twice the volume of the voids between the insert surfaces and the panel opening since greater volumes of cold flowing panel material create undesired problems in the installation of the insert.

In the illustrated embodiment of FIGURES 2–4, the surface of the insert that is in contact with the cold flowed panel material is in the form of three coaxial circular cylinders (flange 22, body 21 and flange 23); in other words, it can also be defined as a surface of revolution formed by rotating the lines b–c, c–f, f–g, g–h, h–i, about an axis co-axially aligned with the axis A–A' of the insert.

In assembling the panel structure as shown in FIGURE 5, the panel member 10 is placed on an anvil or other rigid support 40, the insert 20 is positioned so that the pilot flange 22 is in the panel opening 11 and the compression flange surface 23a bears against the panel face 13 in the peripheral portion surrounding the panel opening. The insert is then pressed by the punch means 41 into and seated in the panel by applying pressure in the direction of the panel opening axis. In the illustrated embodiments, the panel and insert have substantially identical thicknesses, the insert being slightly thinner (a few thousandths of an inch) than the panel thickness. Proper seating is obtained by pressing until the punch bottoms on the face 13 of the panel while supporting the panel by means of the anvil 40. It will be understood that the panel and the insert need not have substantially the same thickness and installation can be controlled by the use of appropriately positioned temporary but positive stops that arrest movement when the insert has been seated to a predetermined position.

In FIGURE 6, there is illustrated an embodiment of the invention that is especially useful in installations where the insert is subject to high torquing forces during installation or use, as for example, when forming part of a pull down bellows-type press nut. In this embodiment, the compression flange 623 is a non-circular cylinder, the cross section of flange 623 is elliptical. As used herein, the term elliptical shall be interpreted as referring to ellipses, ovals, chorded circles (FIGURE 14), rounded ended rectangles and the like. We have found that if the minor diameter of the compression flange (i.e., the diameter on axis x–x') is less than the major diameter of the compression flange (i.e., the diameter on axis y–y') it is still possible to press the insert into a round panel aperture and develop substantial uniform radial compressive stresses but free of stress concentrations around the panel opening provided the minor diameter is slightly larger than the diameter of the panel aperture. In other respects, the construction of the insert is the same as that of embodiments having a circular compression flange; it includes a pilot flange 622, the web 624, and the groove 625.

FIGURES 7–13 inclusive illustrate some of the uses to which the inserts of this invention may be put.

Thus, in FIGURE 7, there is shown an insert 70 installed in a panel 71. The insert is provided with a fastener opening 72 and the opening is counter-sunk 73 to accommodate the fastener head. This arrangement gives a hardened and wear resistant bearing surface and acts to greatly reduce the failure in the bearing area. The counter-sunk head can be made in various shapes in order to accommodate the head of a correspondingly shaped fastener.

In FIGURE 8, the insert 80 is installed in panel 81 and the insert is provided with internal threads 82. Such an arrangement is highly resistant to push out, pull through, torque out and tear out.

In FIGURE 9, the insert 90 is installed in panel 91 and the insert carries a stud 92 that projects away from the panel surface. Such an arrangement is resistant to push out, pull through, torque out and tear out.

In FIGURE 10, the insert is adapted to carry a floating stud. Insert 100 is installed in panel 101 and the stud 102 is mounted in a sleeve 103 that projects away from the face of the pilot flange 104. The floating mount is provided by the lugs 105 that project radially outwardly from the head 106 of the stud and its freedom to move is partially restrained by openings 107 and 108 in the sleeve wall.

FIGURE 11 illustrates a floating nut carried on an insert 110 mounted in the panel. The nut portion 112 is mounted in a manner similar to the floating stud of FIGURE 10.

In FIGURE 12, there is illustrated a pull down bellying-type press nut projecting out from and carried by the pilot flange (it is also contemplated that the press nut sleeve could project outwardly from the compression flange). The fastener in FIGURE 12 is shown fully installed so as to secure two panel members in a "blind" application. Insert 120 is installed in panel 121, and the composite panel assembly 121–122 is securely fastened by the pull down of the press nut 125. The sleeve portion 123 that projects outwardly from the face of the pilot flange 124 includes an internally threaded nut section 125. The press nut has a thin walled or bellows section that is positioned beyond the grip length of the fastener; the thin wall section will belly out to head the nut when torquing forces are applied to the nut section by means of a bolt or an externally threaded tool being inserted through bore 126 that passes through the insert and is coaxially aligned with the axis of the nut threading and made to bear against free face 128. In use the press nut can be installed in the panel 121 without collapsing the bellows and the panel-insert assembly can then be positioned and aligned with the aperture in panel 122 and the press nut headed to secure the panel composite. It is also contemplated that this type of assembly can be made by aligning the the opposed flange surfaces and the interconnecting insert through the panel opening with the press nut sleeve projecting through the opening in panel 122 and then applying pressure to set the compression flange of the insert in panel 121 and simultaneously therewith or shortly thereafter, applying torquing forces to collapse the bellows and head the press nut. The elliptical compression flange of FIGURE 6 is very well suited for use in connection with press nuts because of its very high torque resistance.

The pull down bellying-type press nut of FIGURE 12 is shown in a slightly modified form in FIGURE 13 in that the outside diameter of internally threaded nut section 125 is the same as the outside diameter of pilot flange 124. The press nut in FIGURE 13 is arranged so that the head 129 formed by the bellows section bears against the blind side of panel 122 into which the insert is installed by cold-flowing.

What is claimed is:

1. A structure including a panel member and a press insert seated in a panel opening by cold flowing, the insert being harder than the panel and having a body section and a pair of outwardly projecting annular flanges, the opposed flange surfaces and the interconnecting insert web defining an external annular groove on the insert, the leading flange having a diameter that is less than the diameter of the panel opening in which the insert is to be seated, the trailing flange having an elliptical perimeter whose shorter axis is greater than the diameter of the panel opening in which the insert is to be seated, the volume of the panel material displaced by the trailing flange in the seating of the insert being at least equal to the sum of the volume of the insert groove plus the volume of the annular void between the panel opening and the leading flange extending for the full length of its periphery to an extended intercept with the opposed flange face of the trailing flange, the surfaces of the insert that contact cold flowed panel material being free of re-entrant points or edges that can create stress concentrations.

2. A structure according to claim 1 wherein the opposed flange surfaces that define the groove are parallel and lie in planes generally perpendicular to the axis of the panel opening.

3. A structure according to claim 1 wherein a fastening aperture passes through the insert and is coaxially aligned with the axis of the panel opening.

4. A structure according to claim 1 wherein said volume of panel material displaced by said trailing flange is equal to the sum of said volume of said insert groove plus said volume of said annular void.

5. A structure according to claim 1 wherein a pull-down bellows-type press nut projects outwardly from the face of an insert flange.

6. A structure according to claim 5 wherein the pull down bellows-type press nut projects from the leading flange and has an outside diameter equal to the outside diameter of said leading flange.

7. A structure according to claim 1 wherein said volume of panel material displaced by said trailing flange is greater than the sum of said volume of said insert groove plus said volume of said annular void.

8. A structure according to claim 7 wherein said volume of panel material displaced by said trailing flange is less than twice the sum of said volume of said insert groove plus said volume of said annular void.

9. A structure according to claim 1 wherein the perimeter of the trailing flange is a chorded circle.

10. A structure according to claim 9 wherein the insert is an element of a pull-down type fastener.

11. A structure according to claim 9 wherein said chorded circle includes two straight line segments disposed opposite each other having ends which intersect circularly curved portions of the perimeter of said trailing flange.

12. A structure according to claim 9 wherein said chorded circle includes an even number of straight line segments separated by circularly curved segments, said straight line segments being disposed symmetrically about said trailing flange.

References Cited

UNITED STATES PATENTS

| 2,358,728 | 9/1944 | Miller | 151—41.73 |
| 3,128,813 | 4/1964 | Davis et al. | 151—41.73 |
| 3,171,196 | 3/1965 | Helitas | 29—520 |
| 3,177,916 | 4/1965 | Rosan | 151—41.73 |
| 3,186,284 | 6/1965 | Bennett | 151—41.73 |
| 3,215,026 | 11/1965 | Davis | 151—41.73 |
| 3,241,423 | 3/1966 | Davis | 85—70 |
| 3,242,962 | 3/1966 | Dupree | 151—41.73 |
| 3,289,724 | 12/1966 | Ernest | 151—41.73 |

FOREIGN PATENTS 947,097   1/1964   Great Britain.

MARION PARSONS, Jr., *Primary Examiner.*

U.S. Cl. X.R.

29—432, 520; 85—70